(12) United States Patent
Koyama et al.

(10) Patent No.: US 11,817,549 B2
(45) Date of Patent: Nov. 14, 2023

(54) ALL-SOLID-STATE BATTERY AND METHOD FOR MANUFACTURING SAME

(71) Applicant: HONDA MOTOR CO., LTD., Tokyo (JP)

(72) Inventors: Rio Koyama, Tochigi (JP); Satoshi Yonezawa, Tochigi (JP); Masaki Kunigami, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 17/210,529

(22) Filed: Mar. 24, 2021

(65) Prior Publication Data
US 2021/0305624 A1 Sep. 30, 2021

(30) Foreign Application Priority Data
Mar. 31, 2020 (JP) ................................. 2020-062367

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS

| 2012/0237834 A1 | 9/2012 | Ogasa |
| 2017/0179472 A1* | 6/2017 | Allie ..................... H01M 4/525 |

(Continued)

FOREIGN PATENT DOCUMENTS

| CN | 106252590 A | * 12/2016 | .......... H01M 10/052 |
| JP | 2012209256 A | 10/2012 | |

(Continued)

OTHER PUBLICATIONS

X.P. Liang, F.H. Tan, F. Wei, J. Du. Research progress of all solid-state thin film lithium battery, IOP Conf. Series: Earth and Environmental Science 218 (2019) 012138.*

(Continued)

*Primary Examiner* — Carlos Barcena
(74) *Attorney, Agent, or Firm* — CKC & Partners Co., LLC

(57) ABSTRACT

To provide an all-solid-state battery capable of extracting capacitance at lower pressure, despite a binder-less configuration free from an organic polymer compound binder and a method for manufacturing the same.

An all-solid-state battery 10 includes a positive electrode layer 11 containing positive electrode active material particles and first solid electrolyte particles, a solid electrolyte layer 13 containing the first solid electrolyte particles, and a negative electrode layer 12 containing negative electrode active material particles and the first solid electrolyte particles, the positive electrode layer 11, the solid electrolyte layer 13, and the negative electrode layer 12 being bonded to one another, in which at least one layer of the positive electrode layer 11, the solid electrolyte layer 13, and the negative electrode layer 12 further contains a second solid electrolyte and the second solid electrolyte has crystallinity and is packed and arranged to fill gaps between the particles.

2 Claims, 2 Drawing Sheets

(51) Int. Cl.
  *H01M 4/1391*  (2010.01)
  *H01M 10/0525* (2010.01)
  *H01M 4/02*    (2006.01)

(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2018/0277889 A1* | 9/2018 | Anandan | H01M 10/052 |
| 2019/0058212 A1* | 2/2019 | Okuyama | H01M 4/64 |
| 2020/0044283 A1 | 2/2020 | Okamoto et al. | |
| 2020/0168945 A1* | 5/2020 | Koga | H01G 11/28 |
| 2020/0303778 A1* | 9/2020 | Nogami | H01M 4/38 |
| 2021/0104776 A1 | 4/2021 | Takeuchi et al. | |
| 2021/0184250 A1* | 6/2021 | Yushin | H01M 50/431 |

FOREIGN PATENT DOCUMENTS

| | | |
|---|---|---|
| JP | 2012243645 A | 12/2012 |
| JP | 2016134316 A | 7/2016 |
| JP | 2018116784 A | 7/2018 |
| JP | 2018125150 A | 8/2018 |
| WO | 2014020654 A1 | 2/2014 |
| WO | 2014051032 A1 | 4/2014 |
| WO | 2018123479 A1 | 7/2018 |
| WO | 2019212007 A1 | 11/2019 |

OTHER PUBLICATIONS

Notification of Reasons for Refusal issued in the JP Patent Application No. JP2020-062367, dated Jul. 25, 2023.

* cited by examiner

ALL-SOLID-STATE BATTERY AND METHOD FOR MANUFACTURING SAME

This application is based on and claims the benefit of priority from Japanese Patent Application No. 2020-062367, filed on 31 Mar. 2020, the content of which is incorporated herein by reference.

BACKGROUND OF THE INVENTION

Field of the Invention

The present invention relates to an all-solid-state battery and a method for manufacturing the same.

Related Art

In recent years, lithium-ion batteries having a high energy density have been widely used as secondary batteries to be mounted on electric vehicles, such as electric automobiles and hybrid automobiles.

Since the lithium-ion batteries contain an electrolytic solution containing a flammable organic solvent, there is a necessity of providing a safety device to suppress a temperature rise in short circuit.

To that end, a so-called all-solid-state battery has been recently proposed in which the secondary battery is completely solidified by changing the electrolytic solution to a solid electrolyte layer.

The all-solid-state battery contains a laminate containing at least a positive electrode layer containing positive electrode active material particles, a solid electrolyte layer containing solid electrolyte particles, and a negative electrode layer containing negative electrode active material particles.

Each layer requires an organic polymer compound binder to bind the contained particles.

This binder merely serves as a resistor in the operation of the battery. Therefore, when the binder addition amount is increased to enhance the adhesive strength, the internal resistance of the battery increases and the output of the battery decreases.

On the contrary, when the binder addition amount is reduced, the adhesive strength is lowered, causing delamination due to a volume change during charging and discharging, which lowers the durability, such as cycle characteristics.

As an organic binder-less configuration free from the organic polymer compound binder, Patent Document 1 below discloses an all-solid-state battery containing at least one type selected from the group consisting of sulfide solid electrolytes and hydride solid electrolytes as the solid electrolyte.

Patent Document 1: Japanese Unexamined Patent Application, Publication No. 2018-125150

SUMMARY OF THE INVENTION

Patent Document 1 includes a step of pressurizing an electrode group to plastically deform a solid electrolyte. Due to the plastic deformation of the solid electrolyte, particles of the solid electrolyte layer are densely packed and the resistance at the interface is reduced, thereby improving the capacitance.

However, the plastic deformation of the solid electrolyte requires a large stress and it is difficult to completely remove gaps between the particles only by the plastic deformation.

It is an object of the present invention to provide an all-solid-state battery capable of extracting capacitance at lower pressure, despite an organic binder-less configuration free from an organic polymer compound binder and a method for manufacturing the same.

Focusing on the fact that a specific inorganic solid electrolyte has a low melting point, the present inventors have found that both a binder function and ionic conductivity are achieved by melting and solidifying the specific inorganic solid electrolyte, and thus have accomplished the present invention.

Specifically, the present invention provides the following aspects.

(1) An all-solid-state battery includes:
  a positive electrode layer containing positive electrode active material particles and first solid electrolyte particles,
  a solid electrolyte layer containing the first solid electrolyte particles, and
  a negative electrode layer containing negative electrode active material particles and the first solid electrolyte particles, the positive electrode layer, the solid electrolyte layer, and the negative electrode layer being bonded to one another, in which at least one layer of the positive electrode layer, the solid electrolyte layer, and the negative electrode layer further contains a second solid electrolyte, and
  the second solid electrolyte is solidified to fill gaps between the particles contained in the at least one layer.

According to the invention of the aspect (1), capacitance can be extracted at a lower pressure, despite a binder-less configuration free from an organic polymer compound binder.

(2) In the all-solid-state battery according to the aspect (1), the melting point of the second solid electrolyte is lower than the thermal decomposition temperature of the positive electrode active material particles and the negative electrode active material particles.

According to the aspect (2), the active material can be fusion-bonded using the second solid electrolyte without being thermally decomposed.

(3) In the all-solid-state battery according to the aspect (1) or (2), the second solid electrolyte is a complex hydride solid electrolyte.

According to the aspect (3), the complex hydride solid electrolyte has flexibility in the solid state, and therefore can follow the expansion and contraction during charging and discharging.

(4) In the all-solid-state battery according to the aspect (3), the second solid electrolyte is $LiBH_4$—$LiNH_2$.

According to the aspect (4), $LiBH_4$—$LiNH_2$ is particularly preferably used in the present invention due to the flexibility in the solid state, low melting point, and excellent ionic conductivity.

(5) In the all-solid-state battery according to any one of the aspects (1) to (4), the first solid electrolyte particles contain a sulfide solid electrolyte.

According to the aspect (5), the sulfide solid electrolyte is particularly preferably used in the present invention due to the flexibility in the solid state and excellent ionic conductivity.

(6) In the solid-state battery according to any one of the aspects (1) to (5), the mass ratio between the first solid electrolyte particles and the second solid electrolyte particles is in the range of 80:20 to 99:1.

According to the aspect (6), effects of binding properties and ionic conductivity can be obtained by the second solid electrolyte while utilizing advantages of the flexibility and the ionic conductivity of the first solid electrolyte particles.

(7) In the all-solid-state battery according to any one of the aspects (1) to (6), at least a part of the surfaces of the positive electrode active material particles is coated with an oxide solid electrolyte.

According to the aspect (7), the positive electrode active material coated with the oxide solid electrolyte can reduce the interfacial resistance with the positive electrode active material particles and can prevent a chemical reaction between the positive electrode active material and the second solid electrolyte.

(8) In the all-solid-state battery according to any one of the aspects (1) to (7), the all-solid-state battery is substantially free from a binder containing an organic polymer compound.

According to the aspect (8), capacitance can be extracted at lower pressure, despite a substantially binder-less all-solid-state battery.

(9) A method for manufacturing an all-solid-state battery includes: bonding
a positive electrode layer containing positive electrode active material particles and first solid electrolyte particles,
a solid electrolyte layer containing the first solid electrolyte particles, and
a negative electrode layer containing negative electrode active material particles and the first solid electrolyte particles to one another and the method includes:
a second solid electrolyte particle compounding step of further compounding second solid electrolyte particles in at least one layer of a composition constituting each of the positive electrode layer, the solid electrolyte layer, and the negative electrode layer,
a laminating step of laminating the positive electrode layer, the solid electrolyte layer, and the negative electrode layer to form a laminate, and
an integrally bonding step of heating the laminate under pressure at a temperature at which the second solid electrolyte particles melt, packing the second solid electrolyte to fill gaps between the particles contained in the at least one layer, and then solidifying the second solid electrolyte by cooling and bonding the particles.

According to the invention of the manufacturing method of the aspect (9), since the second solid electrolyte particles are melted, and then solidified by cooling, the second solid electrolyte particles are packed and arranged between the particles to act as a binder and function as a binding material and ionic conductivity can be ensured due to being free from the organic polymer compound binder.

(10) In the method for manufacturing an all-solid-state battery according to the aspect (9), the temperature at which the second solid electrolyte melts in the integrally bonding step is lower than the thermal decomposition temperature of the positive electrode active material particles and the negative electrode active material particles.

According to the aspect (10), the active material can be fusion-bonded using the second solid electrolyte without being thermally decomposed.

(11) In the method for manufacturing an all-solid-state battery according to the aspect (9) or (10), the surfaces of the positive electrode active material particles are coated with an oxide solid electrolyte in advance in the second solid electrolyte particle compounding step.

According to the aspect (11), the positive electrode active material coated with the oxide solid electrolyte can reduce the interfacial resistance with the positive electrode active material particles and can prevent a chemical reaction between the positive electrode active material and the second solid electrolyte.

According to the method for manufacturing an all-solid-state battery of the present invention, capacitance can be extracted at lower pressure, despite an organic binder-less configuration free from an organic polymer compound binder.

Hereinafter, an embodiment of the present invention will be described with reference to the drawings.

Figure 1:
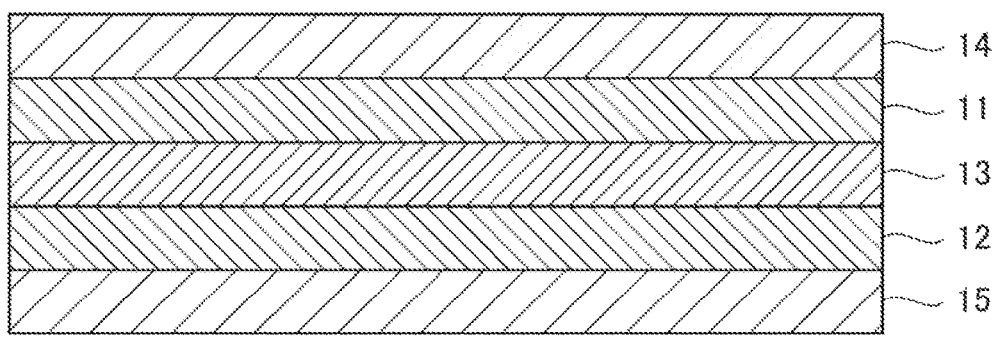
FIG. 1 is a cross-sectional view illustrating a laminated structure of an all-solid-state battery of the present invention.

FIG. 1 is a cross-sectional view illustrating the laminated structure of an all-solid-state battery 10 in this embodiment.

The all-solid-state battery 10 includes a positive electrode layer 11, a negative electrode layer 12, a solid electrolyte layer 13 formed between the positive electrode layer 11 and the negative electrode layer 12, a positive electrode collector 14 collecting current of the positive electrode layer 11, and a negative electrode collector 15 collecting current of the negative electrode layer 12. The positive electrode layer 11 and the positive electrode collector 14 constitute a positive electrode. The negative electrode layer 12 and the negative electrode collector 15 constitute a negative electrode.

By laminating two or more of the all-solid-state batteries 10 (not illustrated), a high-capacity all-solid-state battery can be formed. In the present invention, any one or more layers of the positive electrode layer 11, the negative electrode layer 12, and the solid electrolyte layer 13 contains/contain first solid electrolyte particles and a second solid electrolyte.

(Positive Electrode Layer)

The positive electrode layer 11 used in the all-solid-state battery 10 of the present invention is a layer containing at least positive electrode active material particles and the first solid electrolyte particles.

The first solid electrolyte particles will be described later.

In addition thereto, a conductive auxiliary agent may be optionally contained to improve the conductivity.

As the conductive auxiliary agent, those generally used for solid-state batteries are usable.

The positive electrode active material can be the same as that used for positive electrode layers of common solid-state batteries and is not particularly limited.

For example, in the case of a lithium-ion battery, a layered active material containing lithium, a spinel type active material, an olivine type active material, and the like can be mentioned.

Specific examples of the positive electrode active material include lithium cobalt oxide ($LiCoO_2$), lithium nickel oxide ($LiNiO_2$), $LiNi_pMn_qCo_rO_2$ (p+q+r=1), $LiNi_pAl_qCo_rO_2$ (p+q+r=1), lithium manganese oxide ($LiMn_2O_4$), heteroelement-substituted Li—Mn spinel represented by $Li_{1+x}Mn_{2-x-y}M_yO_4$ (x+y=2, M=at least one kind selected from Al, Mg, Co, Fe, Ni, and Zn), lithium metal phosphate ($LiMPO_4$, M=at least one kind selected from Fe, Mn, Co, and Ni), and the like.

(Positive Electrode Collector)

The positive electrode collector 14 may be made of any material having the function of collecting the current of the positive electrode layer. Preferably, the positive electrode collector 14 includes, for example, aluminum, an aluminum alloy, stainless steel, nickel, iron, titanium, or the like. Among the above, aluminum, aluminum alloys, and stainless steel are preferable.

As the shape of the positive electrode collector 14, a foil shape, a plate shape, or the like can be mentioned, for example.

(Negative Electrode Layer)

The negative electrode layer 12 used in the all-solid-state battery 10 of the present invention is a layer containing at least a negative electrode active material and the first solid electrolyte particles.

The first solid electrolyte particles will be described later.

In addition thereto, a conductive auxiliary agent may be optionally contained to improve the conductivity.

As the conductive auxiliary agent, those generally used for solid-state batteries are usable.

The negative electrode active material may be any material capable of storing and releasing a charge transfer medium. For a lithium-ion battery, examples of the negative electrode active material include lithium transition metal oxides, such as lithium titanate ($Li_4Ti_5O_{12}$), transition metal oxides, such as $TiO_2$, $Nb_2O_3$, and $WO_3$, metal sulfides, metal nitrides, carbon materials, such as graphite, soft carbon, and hard carbon, metal lithium, metal indium, lithium alloys, and the like.

The negative electrode active material may be in the form of powder or in the form of a thin film.

(Negative Electrode Collector)

The negative electrode collector 15 may be made of any material having the function of collecting the current of the negative electrode layer 12.

As materials of the negative electrode collector 15, nickel, copper, stainless steel, and the like can be mentioned.

As the shape of the negative electrode collector 15, a foil shape, a plate shape, and the like can be mentioned.

(Solid Electrolyte Layer)

The solid electrolyte layer 13 is a layer laminated between the positive electrode layer 11 and the negative electrode layer 12 and contains at least the first solid electrolyte particles.

Through the first solid electrolyte particles, the charge transfer medium conduction can be achieved between the positive electrode active material and the negative electrode active material.

(First Solid Electrolyte)

The first solid electrolyte particles may be made of any material having charge transfer medium conductivity (ion conductivity). Examples of such a material include sulfide solid electrolyte materials, oxide solid electrolyte materials, nitride solid electrolyte materials, halide solid electrolyte materials, and the like. Among the above, the sulfide solid electrolyte materials are preferable.

These materials have a charge transfer medium conductivity higher than that of the oxide solid electrolyte materials.

Examples of the sulfide solid electrolyte materials include LYS-halogen (Cl, Br, I), $Li_2S$—$P_2S_5$, $Li_2S$—$P_2S_5$—LiI, and the like in the case of a lithium-ion battery, for example.

The description "$Li_2S$—$P_2S_5$" above means a sulfide solid electrolyte material containing a raw material composition containing $Li_2S$ and $P_2S_5$ and the same applies also to the other descriptions.

As the oxide solid electrolyte materials, NASICON oxides, garnet oxides, perovskite oxides, and the like can be mentioned in the case of a lithium-ion battery, for example.

As the NASICON oxides, oxides containing Li, Al, Ti, P, and O (for example, $Li_{1.5}Al_{0.5}Ti_{1.5}(PO_4)_3$) can be mentioned.

As the garnet oxides, oxides containing Li, La, Zr, and O (for example, $Li_7La_3Zr_2O_{12}$) can be mentioned.

As the perovskite-type oxides, oxides containing Li, La, Ti, and O (for example, $LiLaTiO_3$) can be mentioned.

In the present invention, the first solid electrolyte particles are contained not only in the solid electrolyte layer 13 but in the positive electrode layer 11 and the negative electrode layer 12.

In this case, as the first solid electrolyte particles, the same solid electrolyte particles may be used in all the layers or different first solid electrolyte particles may be used in each layer.

In the present invention, at least a part of the surfaces of the positive electrode active material particles is preferably coated with the above-described oxide solid electrolyte.

By coating the surfaces of the positive electrode active material particles with the oxide solid electrolyte, the interfacial resistance between the positive electrode active material particles and the solid electrolyte, such as the sulfide type, in contact with the positive electrode active material particles can be reduced and the ionic conductivity can be improved.

In addition thereto, a chemical reaction between the positive electrode active material and the second solid electrolyte described later can be prevented.

As the coating with the oxide solid electrolyte, the entire surface of the positive electrode active material is preferably coated in the form of a film free from grain boundaries.

Thus, the grain boundary resistance of the coated particles can be reduced.

Such a film-like coating layer free from grain boundaries is formed by spray coating, for example.

(Second Solid Electrolyte)

In the present invention, any one or preferably all of the solid electrolyte layer 13, the positive electrode layer 11, and the negative electrode layer 12 containing the first solid electrolyte particles further contains/contain the second solid electrolyte.

This second solid electrolyte serves as a binder and has a function of bonding the particles and further has ionic conductivity.

Thus, a binder-less configuration free from a conventional organic polymer compound binder can be achieved.

In the present invention, the description "substantially free from the binder containing the organic polymer compound" means that the content of a so-called resin binder is 1% by mass or less, preferably 0.1% by mass or less, and particularly preferably 0, i.e., not contained at all, in the composition of each layer.

The second solid electrolyte is solidified to closely fill gaps between the particles, such as the active material particles, the solid electrolyte particles, and the conductive auxiliary agent. This state is a state that cannot be obtained by mere plastic deformation described in Patent Document 1 and is achieved based on the fact that only the second solid electrolyte passes through a molten state by heating from the particle state, and then solidified by cooling to take a solid phase state in the present invention. More specifically, the second solid electrolyte covers, as an inorganic binder, gaps between the particles containing the first solid electrolyte.

Thus, other particles can be closely fusion-bonded using the second solid electrolyte.

The melting point of the second solid electrolyte is preferably lower than the thermal decomposition temperature of the positive electrode active material particles and the negative electrode active material particles.

Specifically, the melting point of the second solid electrolyte is preferably 90° C. or higher and 200° C. or less.

By setting the temperature to 90° C. or higher, the second solid electrolyte can be melted after laminating the all-solid-state battery. By setting the temperature to 200° C. or less, the active material particles can be prevented from being thermally decomposed. As such a second solid electrolyte, a complex hydride solid electrolyte can be mentioned as an example. Examples thereof include a complex hydride of lithium borohydride and the like.

More specifically, for example, $LiBH_4$—$LiNH_2$, $LiBH_4$—$LiX$ (X is I, Br, Cl), $LiBH_4$—$SiO_2$, and the like are mentioned.

The molar ratio therebetween can be appropriately set from a preferable melting point range or the like based on the phase diagram. As an example in the case of $LiBH_4$—$LiNH_2$, $LiNH_2$ is preferably 0 to 3 times that of $LiBH_4$.

In the present invention, the mass ratio between the first solid electrolyte particles and the second solid electrolyte is preferably in the range of 80:20 to 99:1, wore preferably 85:15 to 97:3, and particularly preferably 90:10 to 95:5.

When only the ionic conductivity as the solid electrolyte is compared, some sulfide solid electrolytes have ionic conductivity of about $10^{-3}$ s/cm, which is excellent.

Therefore, by mainly using the first solid electrolyte and subsidiarily using the above-described second solid electrolyte as the binder and setting the mass ratio in the ranges above, an all-solid-state battery capable of extracting capacitance at lower pressure can be obtained, despite a binder-less configuration free from an organic polymer compound binder.

(Method for Manufacturing all-Solid-State Battery)

A method for manufacturing the all-solid-state battery 10 of the present invention includes a step of forming, in advance, a composition of each layer constituting the positive electrode layer 11 containing the positive electrode active material particles, the first solid electrolyte particles, the second solid electrolyte particles, and the conductive auxiliary agent particles, the solid electrolyte layer 13 containing the first solid electrolyte particles and the second solid electrolyte particles, and the negative electrode layer 12 containing the negative electrode active material particles, the first solid electrolyte particles, and the second solid electrolyte particles (second solid electrolyte particle compounding step).

The second solid electrolyte particles may be contained in any of the layers.

Next, each layer is molded under pressure, and then the positive electrode layer 11, the solid electrolyte layer 13, and the negative electrode layer 12 are laminated in this order (laminating step). At this stage, the second solid electrolyte is still in a particle state.

Thereafter, the entire laminate is heated and pressurized again. At this time, by heating the second solid electrolyte at a temperature equal to or higher than the melting point of the second solid electrolyte and preferably equal to or lower than the thermal decomposition temperature of the active material, the second solid electrolyte is melted and closely packed between the particles to bind the particles.

This point is different from Patent Document 1 described above.

The heating temperature is preferably 90° C. or higher and 200° C. or less.

Thereafter, the second solid electrolyte is solidified by cooling to be imparted with ionic conductivity of about $10^{-4}$ s/cm and bonds between the particles.

As a result, a layer having both a binder function and ionic conductivity can be formed.

Since the solidified second solid electrolyte has appropriate flexibility and binding force, the capacitance does not decrease even when the restraint pressure in the all-solid-state battery 10 is set as low as 1 MPa or more and 10 MPa or less.

When each layer containing the second solid electrolyte particles is molded under pressure, the second solid electrolyte may be melted by heating to bind between the particles in each layer.

At this time, the bound layers are laminated, and then the layers may be fusion-bonded by heating again or the layers may be bonded using an organic compound binder.

EXAMPLES

Examples and the like of the present invention will be described below but the present invention is not limited to Examples and the like.

Example 1

The following electrode materials were used.
Positive electrode active material: NCM111
Negative electrode active material: Graphite
First solid electrolyte: LPS-halogen (Cl, Br, I)
Second solid electrolyte: $LiBH_4$—$LiNH_2$ ($Li_4BN_3H_{10}$)
Conductive auxiliary agent: Carbon material
Positive electrode collector: Aluminum foil
Negative electrode collector: Copper foil
(Second Solid Electrolyte)

As the above-described second solid electrolyte, $LiBH_4$ and $LiNH_2$ were mixed in a molar ratio of 1:1, and then repeatedly rotated and revolved at 1600 rpm for 2 minutes and pulverized with a mortar and a pestle to give $LiBH_4$—$LiNH_2$ ($Li_4BN_3H_{10}$) of Examples.

Figure 3:
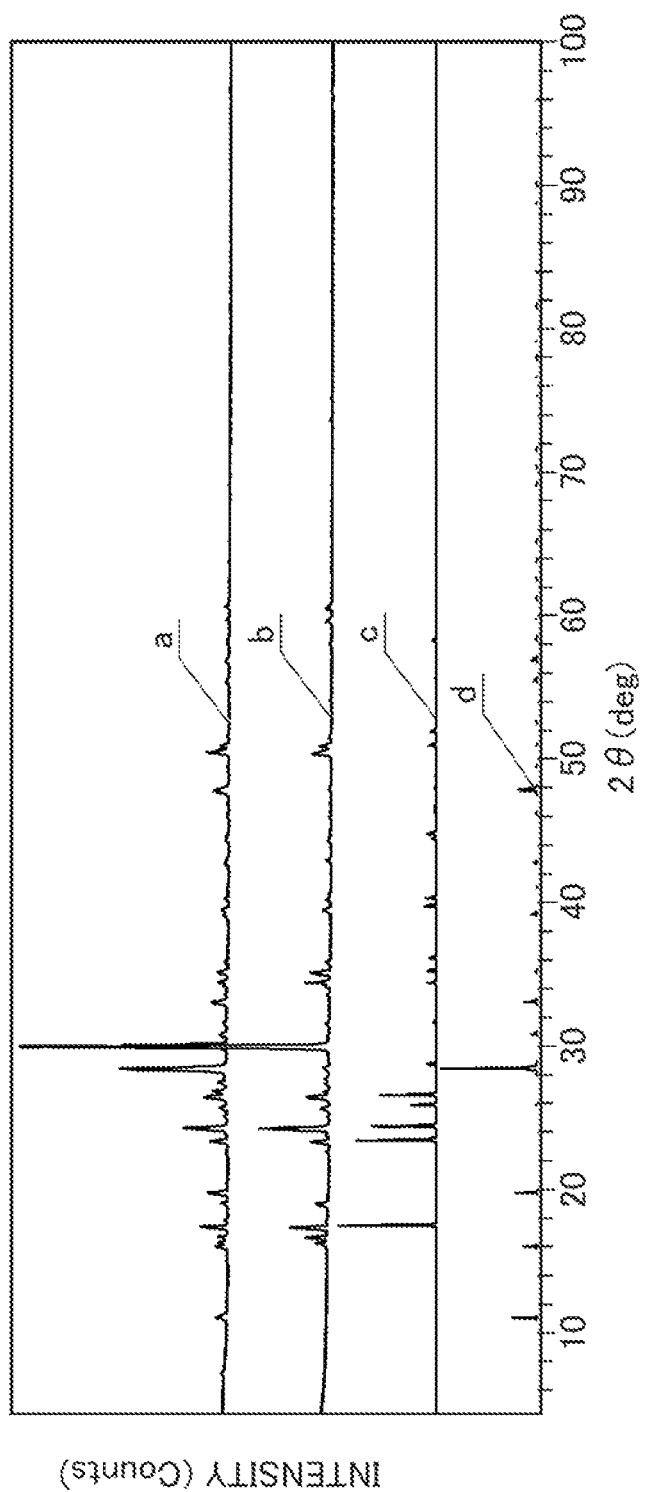
FIG. 3 is a graph illustrating X-ray diffraction chart results in Examples.

As illustrated in the X-ray diffraction chart results of FIG. 3, it is found that the second solid electrolyte in Example 1 is a sample a of FIG. 3 and the peak of $LiBH_4$—$LiNH_2$ ($Li_4BN_3H_{10}$) obtained by calculation is obtained.

Sample a: $LiBH_4$—$LiNH_2$ of Examples (after rotation and revolution treatment)
Sample b: Mixed product of $LiBH_4$ and $LiNH_2$ (mixed state before rotation and revolution)
Comparison chart c: Calculated pattern of $LiBH_4$ (calculated from crystal structure)
Comparison chart d: Calculated pattern of $Li_4BN_3H_{10}$ (calculated from crystal structure)

(Configurations of Positive Electrode Layer, Negative Electrode Layer, Solid Electrolyte Layer)

Composition of Positive Electrode Layer 11
Positive electrode active material particles: 50 to 99% by mass
First solid electrolyte particles: 1 to 50% by weight
Conductive auxiliary agent particles: 0 to 10% by weight
The materials above were mixed to produce a positive electrode mixture.
Positive electrode mixture: 95% by mass
Second solid electrolyte particles: 5% by weight
(5% by mass in terms of the mass ratio of the second solid electrolyte in the total composition)

Then, the materials above were mixed to produce a positive electrode layer.

Composition of Negative Electrode Layer 12
Negative electrode active material particles: 50 to 99% by mass
First solid electrolyte particles: 1 to 50% by weight
The materials above were mixed to produce a negative electrode mixture.
Negative electrode mixture: 95% by mass
Second solid electrolyte particles: 5% by weight
(5% by mass in terms of the mass ratio of the second solid electrolyte in the total composition)
Then, the materials above were mixed to produce a negative electrode layer.

Composition of Solid Electrolyte Layer 13
First solid electrolyte particles: 5% by weight
Second solid electrolyte particles: 95% by weight
(5% by mass in terms of the mass ratio of the second solid electrolyte in the total composition)

(Manufacturing of all-Solid-State Battery)

The positive electrode layer 11, the solid electrolyte layer 13, and the negative electrode layer 12 were laminated in this order, and then heated under pressure at 150° C. at a pressure of 10 MPa for 600 seconds to give an all-solid-state battery of Example 1.

Also in the all-solid-state battery after the lamination, the peak derived from the second solid electrolyte described above was confirmed by the X-ray diffraction, and thus it was able to be confirmed that the second solid electrolyte has crystallinity.

Example 2

An all-solid-state battery of Example 2 was obtained in the same manner as in Example 1, except that the mass ratio of the second solid electrolyte was set to 10% by mass.

Comparative Example 1

An all-solid-state battery of Comparative Example 1 was obtained in the same manner as in Example 1, except that the second solid electrolyte was not compounded.
(Evaluation)

The all-solid-state batteries of Examples and Comparative Example were measured for the capacity retention when the capacitance in a case where the batteries were restrained at 60 MPa and discharged at 0.1 C was set to 100%, and then the batteries were similarly discharged at 0.1 C while relaxing the restraint to 10 MPa, 5 MPa, and 1 MP.

Figure 2:
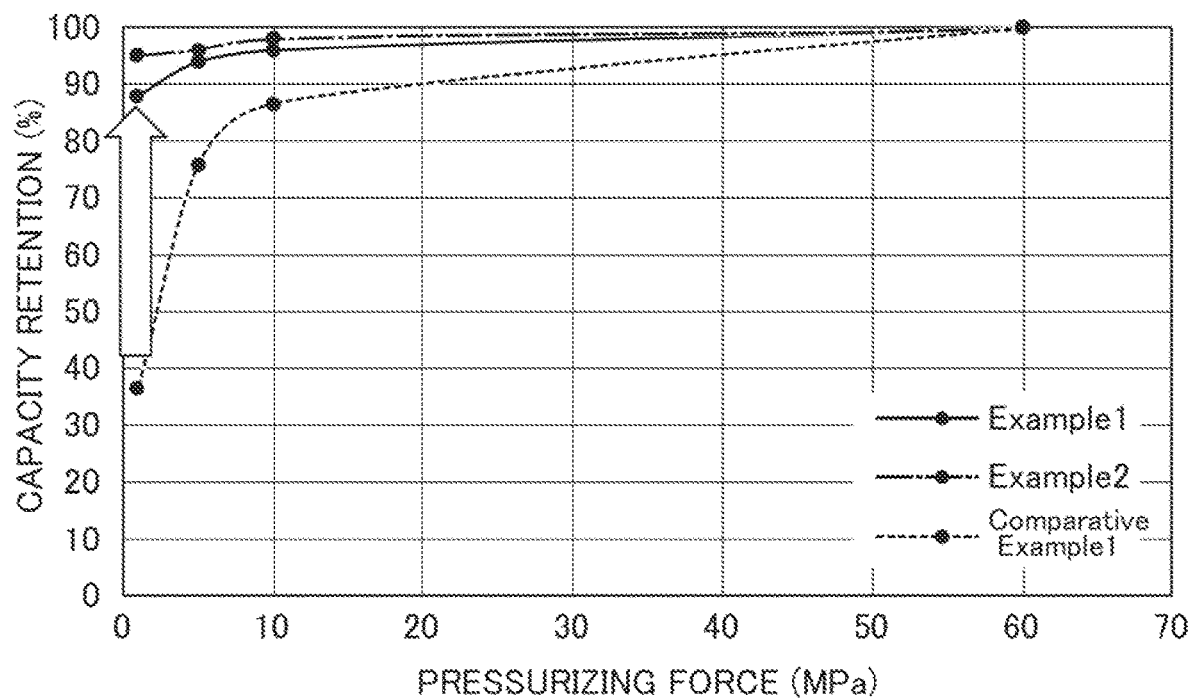
FIG. 2 is a graph illustrating the relationship between the pressurizing force and the capacity retention in Examples.

The results are illustrated in FIG. 2.

As illustrated in FIG. 2, it can be understood in Examples 1 and 2 that, by compounding the second solid electrolyte, the adhesiveness between the particles is improved and the capacity retention when restrained at 1 MPa increases up to 88% in Example 1 and up to 94% in Example 2 from 37% in Comparative Example 1.

EXPLANATION OF REFERENCE NUMERALS

10 all-solid-state battery
11 positive electrode layer
12 negative electrode layer
13 solid electrolyte layer
14 positive electrode collector
15 negative electrode collector

What is claimed is:

1. A method for manufacturing an all-solid-state battery comprising:
   bonding a positive electrode layer containing positive electrode active material particles and first solid electrolyte particles,
   a solid electrolyte layer containing the first solid electrolyte particles, and
   a negative electrode layer containing negative electrode active material particles and the first solid electrolyte particles to one another,
the method comprising:
   a second solid electrolyte particle compounding step of further compounding second solid electrolyte particles in at least one layer of a composition constituting each of the positive electrode layer, the solid electrolyte layer, and the negative electrode layer, wherein in the second solid electrolyte particle compounding step, surfaces of the positive electrode active material particles are coated with an oxide solid electrolyte in advance,
   a laminating step of laminating the positive electrode layer, the solid electrolyte layer, and the negative electrode layer to form a laminate, and
   an integrally bonding step of heating the laminate under pressure at a temperature at which the second solid electrolyte particles melt, packing the second solid electrolyte to fill gaps between the particles contained in the at least one layer, and then solidifying the second solid electrolyte by cooling and bonding the particles.

2. The method for manufacturing an all-solid-state battery according to claim 1, wherein
   a temperature at which the second solid electrolyte melts in the integrally bonding step is lower than a thermal decomposition temperature of the positive electrode active material particles and the negative electrode active material particles.

* * * * *